United States Patent
Hiratsuka et al.

(10) Patent No.: US 8,057,555 B2
(45) Date of Patent: Nov. 15, 2011

(54) OUTER CASING OF NON-AQUEOUS ELECTROLYTE BATTERY AND PRODUCTION METHOD THEREFOR

(75) Inventors: Masaru Hiratsuka, Tokyo (JP); Mitsuo Sakamoto, Tokyo (JP); Masanori Naritomi, Tokyo (JP)

(73) Assignees: Sony Co., Ltd., Tokyo (JP); Taisei Plas Co., Ltd., Tokyo (JP)

( * ) Notice: Subject to any disclaimer, the term of this patent is extended or adjusted under 35 U.S.C. 154(b) by 80 days.

(21) Appl. No.: 12/707,356

(22) Filed: Feb. 17, 2010

(65) Prior Publication Data
US 2010/0162558 A1    Jul. 1, 2010

Related U.S. Application Data

(62) Division of application No. 10/515,316, filed as application No. PCT/JP03/16175 on Dec. 17, 2003.

(30) Foreign Application Priority Data

Dec. 17, 2002 (JP) ................................. 2002-365773
Oct. 1, 2003 (JP) ................................. 2003-342769

(51) Int. Cl.
*H01M 2/00*    (2006.01)
*H01M 2/08*    (2006.01)

(52) U.S. Cl. ....... 29/623.1; 29/623.2; 429/163; 429/185
(58) Field of Classification Search .................. None
See application file for complete search history.

(56) References Cited

U.S. PATENT DOCUMENTS

| 3,430,845 A | 3/1969 | Susuki et al. |
| 6,451,474 B1 * | 9/2002 | Kozu et al. ..................... 429/100 |

FOREIGN PATENT DOCUMENTS

| JP | 2000-323110 A | 11/2000 |
| JP | 2001-93495 A | 4/2001 |
| JP | 2001-93497 A | 4/2001 |
| JP | 2001-319633 A | 11/2001 |

OTHER PUBLICATIONS

Machine translation of JP 2001-319633, Takeishi Ryuta, Nov. 16, 2001.*
International Search Report, PCT/JP03/16175, Apr. 13, 2004 (1 page).

* cited by examiner

*Primary Examiner* — Barbara Gilliam
*Assistant Examiner* — Kwang Han
(74) *Attorney, Agent, or Firm* — Rader, Fishman & Grauer PLLC

(57) ABSTRACT

An outer casing of a non-aqueous electrolyte battery is capable of being mass-produced as well as thin and resistant to damage. The outer casing 4 comprises a casing body 4a and a cover 4b. After being internally packaged, a non-aqueous electrolyte battery 2, e.g. a lithium-ion polymer secondary battery, is sandwiched between the casing body 4a and the cover 4b, which are then joined together integrally. The cover 4b is formed from a film-shaped sheet material 4c of a synthetic resin to make the outer casing 4 thin. The casing body 4a and the cover 4b have a casing body outer peripheral frame 9 and a cover outer peripheral frame 10, respectively, formed by injection molding. Joint portions of the casing body 4a and the cover 4b have stepped portions 9a and 10a, respectively. The stepped portions ensure the mechanical strength against shock and impact. With this structure, the outer casing 4 is resistant to damage.

2 Claims, 14 Drawing Sheets

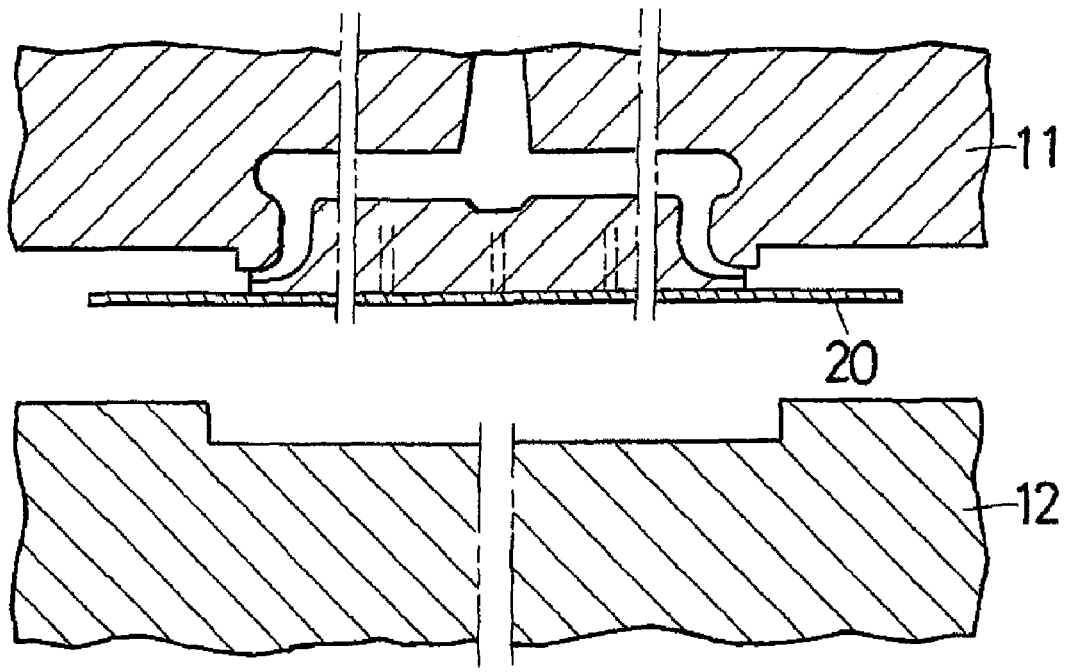
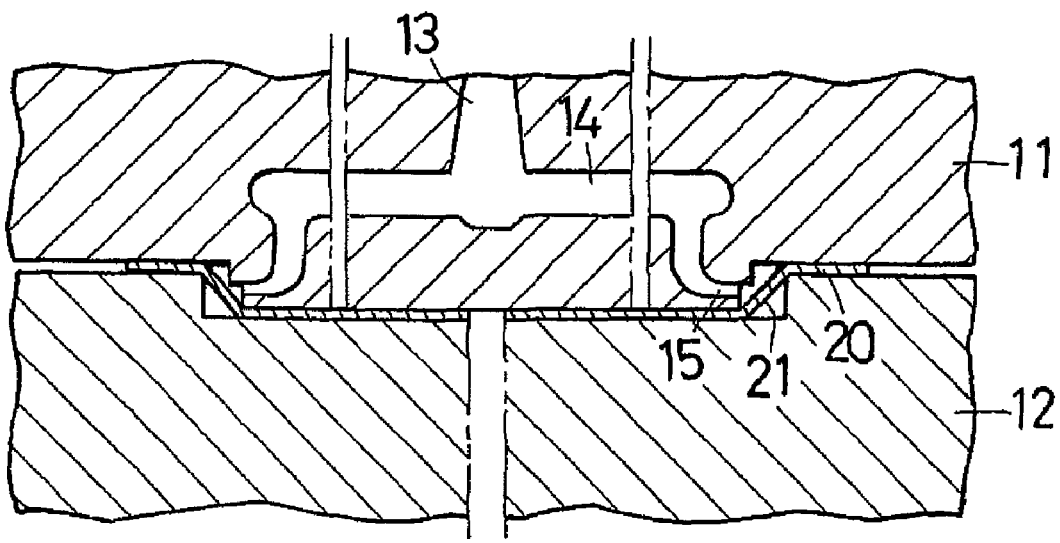

OUTER CASING OF NON-AQUEOUS ELECTROLYTE BATTERY AND PRODUCTION METHOD THEREFOR

CROSS REFERENCE TO RELATED APPLICATIONS

The present application is a Divisional Application of patent application Ser. No. 10/515,316, filed Nov. 23, 2004, which is a national stage application of PCT/JP2003/016175 filed Dec. 17, 2003, which claims priority to Japanese Patent Applications JP2002-365773 filed on Dec. 17, 2002 and JP2003-342769, filed Oct. 1, 2003, the entire contents of which are herein incorporated by reference.

TECHNICAL FIELD

The present invention relates to an outer casing for externally packaging a non-aqueous electrolyte battery body packaged in an aluminum laminated film or the like and also relates to a production method for the outer casing. More particularly, the present invention relates to an outer casing of a non-aqueous electrolyte battery that externally packages a non-aqueous electrolyte battery element with a thin casing body formed of a synthetic resin or a film-shaped sheet material having a frame member of a synthetic resin integrally fixed to the outer periphery thereof. The present invention also relates to a production method for the outer casing.

BACKGROUND ART

Conventionally, a lithium-ion battery is housed in a metal case, e.g. a steel can, or an aluminum can, and a polymer battery is packaged in an aluminum laminated film. These batteries need to be further externally packaged to protect them against shock from dropping or other external impact. There are known methods for externally packaging the battery body, for example, a method wherein the battery body is hermetically covered with a case-shaped member formed of an aluminum sheet, a plastic material, etc., and a method wherein the outer surface of the battery body is covered with a thermoplastic resin by injection molding, thereby packaging the battery body in the molded resin.

It is also publicly known that heat-shrinkable tubing made of polyvinyl chloride or the like is used as a heat-shrinkable synthetic resin material for covering batteries. Stretched tubing made of a mixed composition consisting essentially of an olefin-based ionomer resin is also publicly known as an example of heat-shrinkable tubing [for example, see Japanese Patent Application Unexamined Publication (KOKAI) No. Hei 11-170365].

However, the conventional externally packaging methods have not yet satisfied all the demands but still have many problems to be solved. Particularly, cellular phones and the like require as thin a battery as possible, and a battery that meets the requirement has appeared. If this battery is covered with thin hear-shrinkable tubing, the tubing may be partially wrinkled. Therefore, there is a problem in terms of reliability in mass production of batteries of stable quality. Meanwhile, injection molding is excellent in mass productivity but disadvantageous for the following reason. With the conventional injection molding, the flow of molten resin is deteriorated as the thickness of the molded part to be produced is reduced. Accordingly, there is a limit to the reduction of the part thickness.

Cellular phones and the like require a material having chemical resistance and fire retardance. To prepare a resin material satisfying these requirements, PBT (polybutylene terephthalate) resin may be mixed with a fire retardant consisting essentially of an inorganic material, for example. In this case, a part thickness of at least 0.3 mm to 0.4 mm is required because the flow of molten resin would otherwise be deteriorated. Thus, it is even more difficult to obtain a thin molded part. Accordingly, the thickness of injection-molded parts cannot be reduced to less than a predetermined thickness as long as an injection molding method based on the presently common technique is employed. Lithium-ion polymer secondary batteries, in particular, are characterized by their capability of implementing a thin and lightweight structure. Therefore, a thick outer casing that would lessen the advantageous feature of lithium-ion polymer secondary batteries cannot be adopted.

The outer casing for lithium-ion polymer secondary batteries is required to exhibit stable mechanical strength despite the thin and lightweight structure. Meanwhile, there has been proposed a method of producing a thin-walled molded part for housing an electronic component, wherein a thin-walled portion of the molded part is formed of a film, and a thick-walled portion thereof is formed by injection molding [Japanese Patent Application Unexamined Publication (KOKAI) No. 2002-283507]. However, the thin-walled molded part does not completely cover the outer surface of the housed component. Therefore, it cannot be employed for the above-described outer packaging of batteries.

DISCLOSURE OF THE INVENTION

With the above-described technical background, the present invention was made to attain the following objects.

An object of the present invention is to provide an outer casing of a non-aqueous electrolyte battery in which a side of the casing is formed from a film-shaped sheet material formed of a synthetic resin or by injection molding, thereby realizing an extremely thin external package exhibiting stable mechanical strength, and also provide a production method for the outer casing.

Another object of the present invention is to provide an outer casing of a non-aqueous electrolyte battery that is easy to manufacture and suitable for mass production by injection molding process of high productivity, and also provide a production method for the outer casing.

Still another object of the present invention is to provide an outer casing of a non-aqueous electrolyte battery that allows implementation of external packaging excellent in design, and also provide a production method for the outer casing.

An advantage of the present invention is as follows. An outer casing of a non-aqueous electrolyte battery is formed by joining together a casing body and a cover that are different in configuration from each other, or by joining together a pair of mating molded pieces of the same configuration. Joint portions for joining together the two constituent members of the outer casing are formed integrally on the two constituent members, respectively, in the form of a stepped structure. Therefore, the outer casing can be formed thin in thickness, and yet the required mechanical strength can be ensured satisfactorily.

Another advantage of the present invention is that the capacity-volume efficiency and the capacity-weight efficiency of the battery pack can be improved.

Still another advantage of the present invention is that the production method for the outer casing can employ injection molding process that is simple and capable of mass production.

A further advantage of the present invention is that because a part of the outer casing can be formed by injection molding, the freedom of configuration increases, so that the outer casing can be formed into a product that is tasteful and excellent in design.

The present invention adopts the following means to solve the above-described problems.

An outer casing for externally packaging a non-aqueous electrolyte battery according to a first feature of the present invention is an outer casing (4) characterized by including a rectangular casing body (4a) formed of a synthetic resin for accommodating the non-aqueous electrolyte battery. The casing body has a casing body outer peripheral frame (9) integrally provided on the outer peripheral edge of a side of the casing body. The outer casing (4) further includes a cover (4b) including a film-shaped side panel (4c) formed of a synthetic resin that covers an open side of the non-aqueous electrolyte battery accommodated in the casing body (4a). The cover (4b) further includes a cover outer peripheral frame (10) formed of a synthetic resin that is integrally fixed to the outer peripheral edge of the side panel (4c). Further, the outer casing (4) includes joint portions for integrally joining together the casing body outer peripheral frame (9) and the cover outer peripheral frame (10) in opposed relation to each other.

It should be noted that the term "film-shaped" as used in the present invention means being in the form of a thin film, a thin plate, or a sheet, but does not necessarily mean being a film.

An outer casing for externally packaging a non-aqueous electrolyte battery according to a second feature of the present invention is characterized as follows. In the outer casing according to the first feature of the present invention, the joint portions have positioning means (9a and 10a) for positioning the casing body outer peripheral frame (9) and the cover outer peripheral frame (10) relative to each other.

An outer casing for externally packaging a non-aqueous electrolyte battery according to a third feature of the present invention is characterized as follows. In the outer casing according to the second feature of the present invention, the positioning means (9a and 10a) include a first stepped portion (9a) with a stair-shaped sectional configuration that is formed on the casing body outer peripheral frame (9) and a second stepped portion (10a) with a stair-shaped sectional configuration that is formed on the cover outer peripheral frame (10). The first stepped portion (9a) and the second stepped portion (10a) are fitted in opposed relation to each other and joined together integrally.

An outer casing for externally packaging a non-aqueous electrolyte battery according to a fourth feature of the present invention is characterized as follows. In the outer casing according to the first or second feature of the present invention, the casing body (4a) has terminal windows (3) in the form of through-holes that allow contact with input and output terminals of the non-aqueous electrolyte battery.

An outer casing for externally packaging a non-aqueous electrolyte battery according to a fifth feature of the present invention is characterized as follows. In the outer casing according to the third feature of the present invention, the first stepped portion (9a) and the second stepped portion (10a) each have surfaces differing in height from each other.

A production method according to a sixth feature of the present invention is a method of producing the outer casing for externally packaging a non-aqueous electrolyte battery according to the first feature of the present invention. The production method is characterized in that the casing body (4a) is formed by injection molding in an injection-molding mold. The side panel (4c) is inserted into an injection-molding mold, and a synthetic resin is injected onto the outer peripheral edge of the side panel (4c) to integrally fix the cover outer peripheral frame (10) to the outer peripheral edge of the side panel (4c), thereby forming the cover (4b). Then, the casing body outer peripheral frame (9) and the cover outer peripheral frame (10) are integrally joined together in opposed relation to each other, thereby producing the outer casing (4).

A production method for an outer casing of a non-aqueous electrolyte battery according to a seventh feature of the present invention is characterized as follows. In the production method according to the sixth feature of the present invention, the above-described fixing is fusion bonding by the molten resin for forming the cover outer peripheral frame (10) in the injection-molding mold, and the above-described joining is effected by ultrasonic welding.

A production method for an outer casing of a non-aqueous electrolyte battery according to an eighth feature of the present invention is characterized as follows. In the production method according to the seventh feature of the present invention, welding portions (22) in the form of projections for the above-described joining are formed on the casing body outer peripheral frame (9) and/or the cover outer peripheral frame (10) to effect the ultrasonic welding.

An outer casing for externally packaging a non-aqueous electrolyte battery according to a ninth feature of the present invention is characterized by including a film-shaped first side panel (44e) formed of a synthetic resin that covers a side of the non-aqueous electrolyte battery that is wider than other sides of the battery. A film-shaped second side panel (44c) formed of a synthetic resin covers a side of the non-aqueous electrolyte battery opposite to the above-described side. A first outer peripheral frame (44f) formed of a synthetic resin is integrally fixed to the outer peripheral edge of the first side panel (44e). A second outer peripheral frame (44d) formed of a synthetic resin is integrally fixed to the outer peripheral edge of the second side panel (44c). The outer casing further includes joint portions for integrally joining together the first outer peripheral frame (44f) and the second outer peripheral frame (44d) in opposed relation to each other.

An outer casing for externally packaging a non-aqueous electrolyte battery according to a tenth feature of the present invention is characterized as follows. In the outer casing according to the ninth feature of the present invention, the joint portions have positioning means (49a) for positioning the first outer peripheral frame (44f) and the second outer peripheral frame (44d) relative to each other.

An outer casing for externally packaging a non-aqueous electrolyte battery according to an eleventh feature of the present invention is characterized as follows. In the outer casing according to the tenth feature of the present invention, the positioning means (49a) include recesses (49a) and projections to be fitted into the recesses (49a) to effect positioning. The recesses (49a) and the projections are formed on the first outer peripheral frame (44f) and the second outer peripheral frame (44d).

An outer casing for externally packaging a non-aqueous electrolyte battery according to a twelfth feature of the present invention is characterized as follows. In the outer casing according to the ninth feature of the present invention, the first outer peripheral frame (44f) and/or the second outer peripheral frame (44d) has terminal windows (43) in the form of through-holes that allow contact with input and output terminals of the non-aqueous electrolyte battery.

A production method according to a thirteenth feature of the present invention is a method of producing the outer casing for externally packaging a non-aqueous electrolyte battery according to the ninth feature of the present invention. The production method is characterized in that the first side panel (44e) is inserted into an injection-molding mold, and a synthetic resin is injected onto the outer peripheral edge of the first side panel (44e) to integrally fix the first outer peripheral frame (44f) to the outer peripheral edge of the first side panel (44e), thereby forming a first casing body member (44a). The second side panel (44c) is inserted into an injection-molding mold, and a synthetic resin is injected onto the outer peripheral edge of the second side panel (44c) to integrally fix the second outer peripheral frame (44d) to the outer peripheral edge of the second side panel (44c), thereby forming a second casing body member (44b). The first casing body member (44a) and the second casing body member (44b) are opposed to each other, and the first outer peripheral frame (44f) and the second outer peripheral frame (44d) are joined together integrally.

A production method for an outer casing for a non-aqueous electrolyte battery according to a fourteenth feature of the present invention is characterized as follows. In the production method according to the thirteenth feature of the present invention, the above-described fixing is fusion bonding by the molten resin for forming the first outer peripheral frame and by the molten resin for forming the second outer peripheral frame in the respective injection-molding molds, and the above-described joining is effected by ultrasonic welding.

A production method for an outer casing of a non-aqueous electrolyte battery according to a fifteenth feature of the present invention is characterized as follows. In the production method according to the fourteenth feature of the present invention, welding portions (22) in the form of projections for the above-described joining are formed on the first outer peripheral frame (44f) and/or the second outer peripheral frame (44d) to effect the ultrasonic welding.

It should be noted that the term "non-aqueous electrolyte battery" as used in the present invention means a battery containing a non-aqueous electrolyte material in the electrolyte thereof. Examples of such non-aqueous electrolyte material include an electrolytic solution, a polymer gel electrolyte, a solid electrolyte, a polymer electrolyte, and a molten salt electrolyte. Batteries in the present invention include not only secondary batteries but also primary batteries. Batteries containing a non-aqueous electrolyte material include lithium-ion batteries, lithium-ion secondary batteries, lithium-ion polymer batteries, etc.

BRIEF DESCRIPTION OF THE DRAWINGS

FIG. 5 is a sectional view of an injection-molding mold used to form a cover.

FIG. 6 is a sectional view showing the injection-molding mold when it is closed.

BEST MODE FOR CARRYING OUT THE INVENTION

First Embodiment

Figure 1:
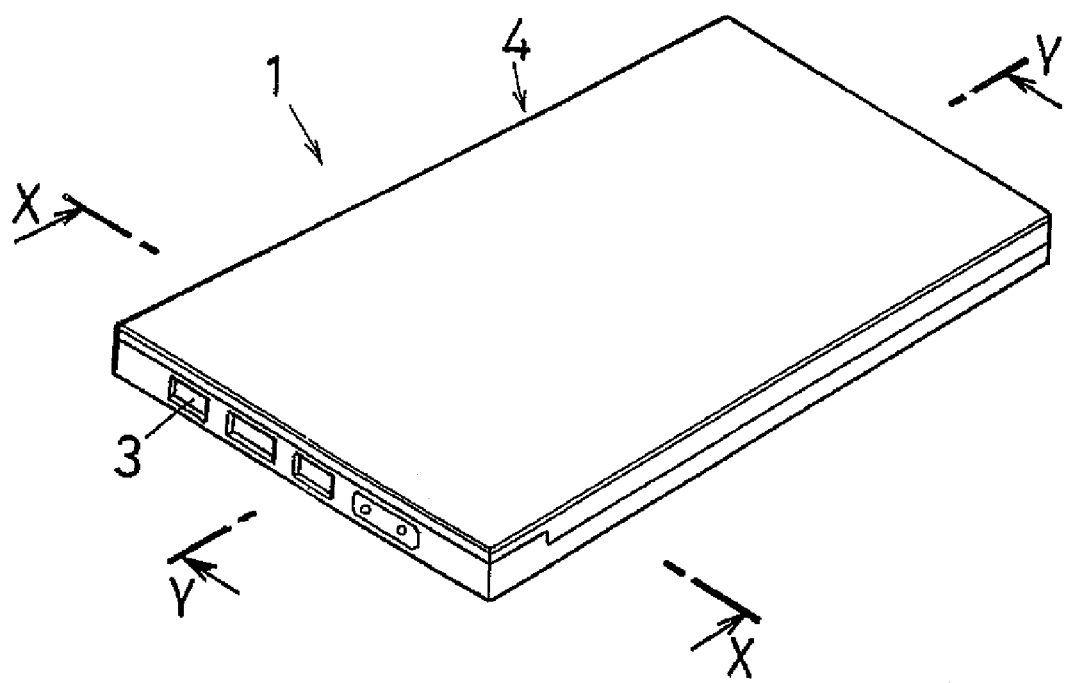
FIG. 1 is an external view showing a lithium-ion polymer secondary battery.
Figure 2:
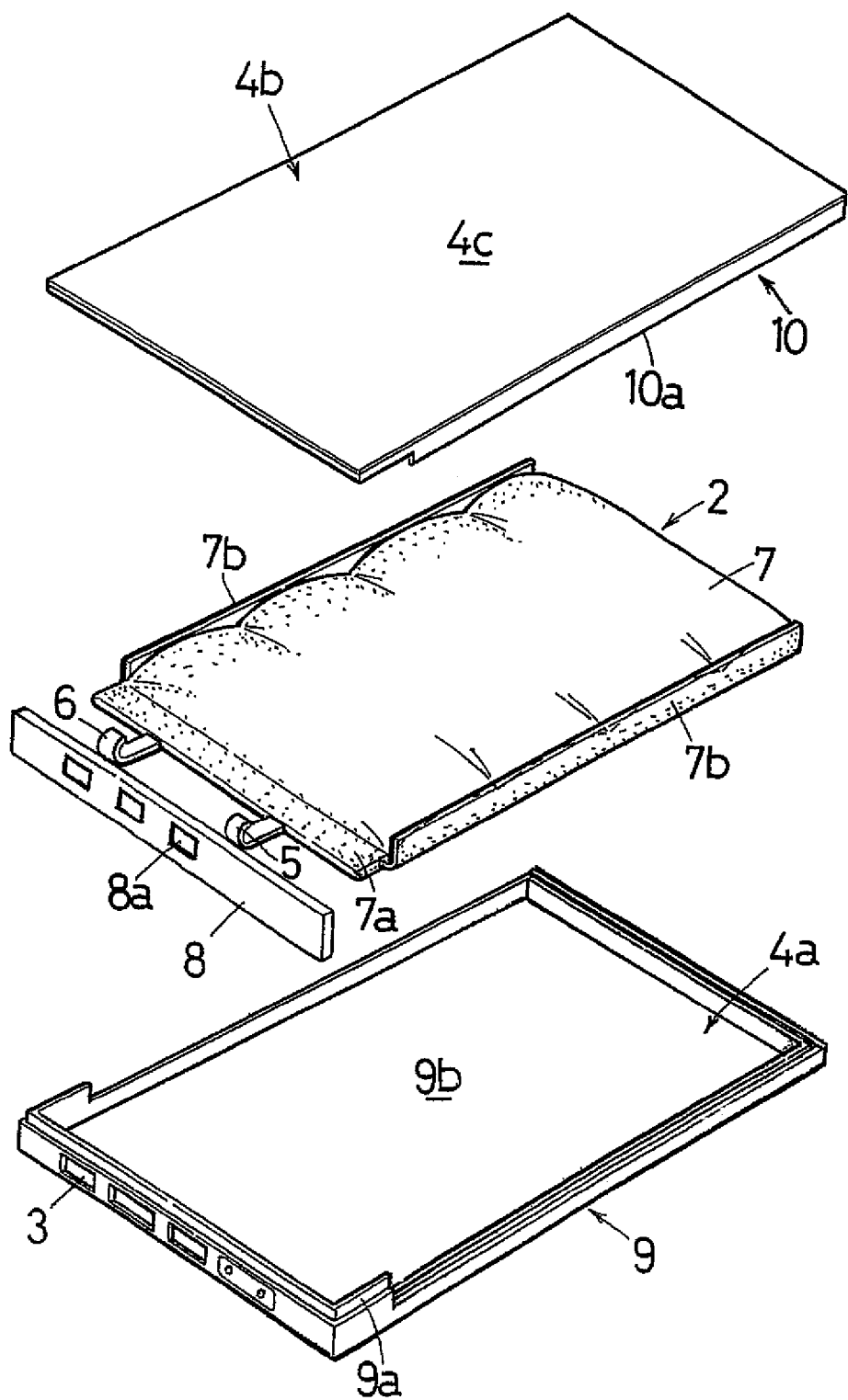
FIG. 2 is an exploded view illustrating the lithium-ion polymer secondary battery.
Figure 3:
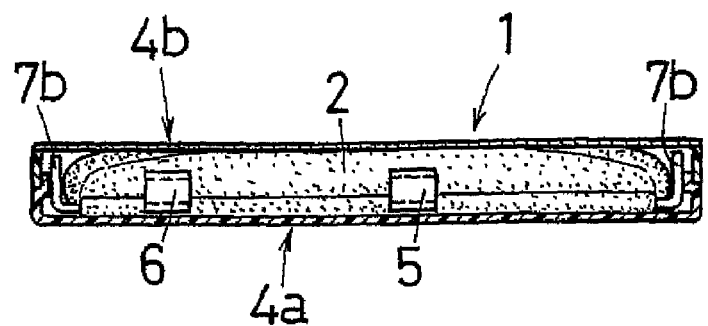
FIG. 3 is a sectional view taken along the line X-X in FIG. 1.
Figure 4:
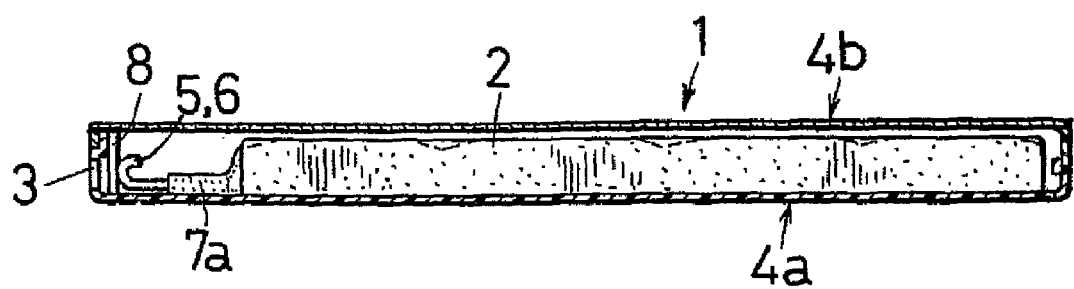
FIG. 4 is a sectional view taken along the line Y-Y in FIG. 1.

A first embodiment of the present invention will be described below. FIG. 1 is an external view of a lithium-ion polymer secondary battery 1 to which the present invention is applied. FIG. 2 is an exploded view of the lithium-ion polymer secondary battery 1. FIG. 3 is a sectional view taken along the line X-X in FIG. 1. FIG. 4 is a sectional view taken along the line Y-Y in FIG. 1.

The lithium-ion polymer secondary battery 1 is a repeatedly rechargeable battery, which is used as a battery for a cellular phone or the like. The lithium-ion polymer secondary battery 1 is a thin and lightweight battery implemented by replacing an electrolytic solution with a gel-state polymer electrolyte. In this example, the lithium-ion polymer secondary battery 1 is a thin battery (e.g. 3.8 mm in thickness) implemented so as to be usable in a cellular phone or the like.

An outer casing 4 of the lithium-ion polymer secondary battery 1 is a synthetic resin casing produced by a method described later. The outer casing 4 basically comprises a casing body 4a and a cover 4b. The casing body 4a of the outer casing 4 has three terminal windows 3 in the form of through-holes through which an electric current is input and output. FIG. 2 is an exploded view of the lithium-ion polymer secondary battery. A battery element 2 is a main body constituting the lithium-ion polymer secondary battery.

The battery element 2 is formed by stacking a strip anode and a strip cathode with a polymer electrolyte layer and/or a separator interposed therebetween, and winding the stack structure in the longitudinal direction. In addition, an anode terminal 5 and a cathode terminal 6 are led out from the anode and the cathode, respectively. The anode comprises a strip anode current collector and an anode active material layer formed thereon. Further, a polymer electrolyte layer is formed on the anode active material layer. Further, a polymer electrolyte layer is formed on a cathode active material layer. The anode terminal 5 and the cathode terminal 6 are joined to the anode current collector and the cathode current collector, respectively. The materials and functions of these components are not directly related to the subject matter of the present invention. Therefore, a detailed description thereof is omitted.

The battery element 2 is packaged in an aluminum laminated film 7. The aluminum laminated film 7 has a laminated structure formed from a polypropylene (PP) layer, an aluminum layer, a polyamide layer, etc. stacked in that order from the inner side. The aluminum layer prevents water from entering the interior of the battery. The polypropylene layer prevents change in quality of the polymer electrolyte and also serves as a joint surface of the aluminum laminated film 7. That is, joining for sealing the aluminum laminated film 7 is effected by fusion-bonding the opposed edges of the polypropylene layer.

The polyamide layer imparts strength and gas barrier properties to the aluminum laminated film 7. The aluminum laminated film 7 extends beyond the outer periphery of the rectangular battery element 2 at three sides thereof. That is, the aluminum laminated film 7 has a top hem portion 7a corresponding to the top position of the battery element 2 and side hem portions 7b corresponding to the side positions of the battery element 2. The top hem portion 7a and the side hem portions 7b are provided by forming the fusion-bonded portions of the polypropylene layer with an extra width at the three sides of the aluminum laminated film 7 to prevent water from entering the interior of the battery element 2 from the outside. As shown in FIG. 2, the side hem portions 7b are folded in one direction when the battery element 2 is accommodated in the outer casing 4.

The elongated strip anode and cathode terminals 5 and 6 are folded and laminated to the top hem portion 7a. A protective circuit board 8 is disposed adjacently to the anode terminal 5 and the cathode terminal 6. The distal ends of the anode and cathode terminals 5 and 6 are connected to respective terminals on the protective circuit board 8 by spot welding, ultrasonic welding, etc., thereby being electrically connected to each other. Because the protective circuit board 8 is accommodated within the thickness of the battery element 2, together with the top hem portion 7a, the lithium-ion polymer secondary battery 1 can be made compact in size.

On the protective circuit board 8 are implemented a protective element, e.g. a thermostat, a PTC, or a temperature fuse, and/or an electronic circuit for protection (not shown). Further, input/output terminals 8a are provided on the protective circuit board 8, which are contact terminals for drawing an electric current. The input/output terminals 8a are capable of contacting terminals on the associated equipment that are inserted from the terminal windows 3. Although in this example the terminal windows 3 are formed in a side of the casing body 4a, the terminal windows 3 may be formed in another side that is at 90 degrees to the above-described side, for example, in the cover 4b. Alternatively, the terminal windows 3 may be formed in a region extending over from the casing body 4a to the cover 4b. The battery element 2 and the protective circuit board 8 are accommodated in the casing body 4a, which constitutes one casing half, and covered with the cover 4b, which constitutes the other casing half.

The first embodiment of the present invention relates to the above-described outer casing 4. That is, the outer casing 4 comprises the casing body 4a and the cover 4b, which are provided in the form of two casing halves, and the battery element 2 and the protective circuit board 8 are sandwiched between the two casing halves, thereby being packaged. The completed lithium-ion polymer secondary battery 1 is a product in which the battery element 2 and the protective circuit board 8 are packaged and integrated with the casing body 4a and the cover 4b. The product name, the manufacturer name, etc. are indicated on the surface of the outer casing 4 by using a label or the like.

Conventionally, a synthetic resin plastic molded casing has been used, as stated above. The synthetic resin casing can be produced with a complicated configuration by injection molding. However, there is a limit to the reduction in thickness of the conventional synthetic resin casing. In contrast to this, the first embodiment of the present invention can fabricate a lightweight and thin outer casing having a complicated configuration because of the use of a sheet material or a combination of a sheet material and injection molding process. Further, the first embodiment of the present invention has the advantage that the mold structure is simplified, as will be explained later.

The outer casing 4 according to the present invention makes use of the advantageous features of the material. That is, the casing body 4a for accommodating the lithium-ion polymer secondary battery 1 comprises a surface portion 9b (side) injection-molded as thin as possible and a casing body outer peripheral frame 9 with a stepped portion 9a that forms the outer peripheral edge of the surface portion 9b. The cover 4b opposed to the casing body 4a comprises a sheet material 4c (side) in the form of a film (thin film) of a synthetic resin and a cover outer peripheral frame 10 with a stepped portion 10a that is formed by injecting a synthetic resin to cover the outer peripheral edge of the sheet material 4c. The casing body outer peripheral frame 9 of the casing body 4a and the cover outer peripheral frame 10 of the cover 4b are opposed and joined to each other through the stepped portions 9a and 10a, thereby obtaining an outer casing 4 that is thin and yet mechanically strong and easy to manufacture.

An end portion inside the casing body 4a may be integrally formed with board supporting ribs for supporting the protective circuit board 8, according to need. In this embodiment, however, such ribs are not shown in the figure. It is a matter of course that the lithium-ion polymer secondary battery 1 is placed in the casing body 4a so as not to be displaced. FIGS. 3 and 4 show the structure of the outer casing 4 accommodating the battery element 2, which is a non-aqueous electrolyte battery, as stated above.

[Production Method for Outer Casing 4]

Next, a production method for the outer casing 4 will be described. In this embodiment, the casing body 4a has an integral structure formed by injection molding. That is, the surface portion 9b for accommodating the battery element 2 and the casing body outer peripheral frame 9 are simultaneously injection-molded in the same cavity to form an integral structure. The casing body outer peripheral frame 9 of the casing body 4a is formed with a stepped portion 9a having a stair-shaped sectional configuration. The stepped portion 9a may be provided with an undercut for fitting. In this case, injection molding is performed by a publicly known method capable of removal from the mold by splitting the mold or making use of elastic deformation.

The injection molding method is based on a common method. Therefore, a description thereof is omitted. The surface portion 9b for accommodating the battery element 2 is made as thin as possible within the range in which the mechanical strength required for the outer casing 4 can be ensured. Meanwhile, the surface portion of the cover 4b that covers the battery element 2 is formed of a sheet material 20 (stock for the sheet material 4c) in the form of a film (0.1 mm in thickness in this example) of a synthetic resin, as shown in FIG. 5. One surface of the sheet material 20 may be previously printed with the specifications, trademark, etc. of the product or labeled to show such information.

Because the stock of the sheet material 20 is flat with a plane surface, the sheet material 20 before forming process can be easily printed with information indicating model name, capacity, place of manufacture, etc. or labeled to indicate such information instead of printing. The sheet material 20 is formed of a synthetic resin. Examples of usable synthetic resins are PBT (polybutylene terephthalate), ABS resin, PC (polycarbonate), PET (polyethylene terephthalate), etc. In the first embodiment, a sheet material 20 with a thickness of the order of from 0.02 mm to 0.3 mm is used. As shown in FIG. 5, the rectangular sheet material 20 is placed on a stationary mold member 11 of an injection-molding mold by vacuum holding or other similar means.

Figure 7:
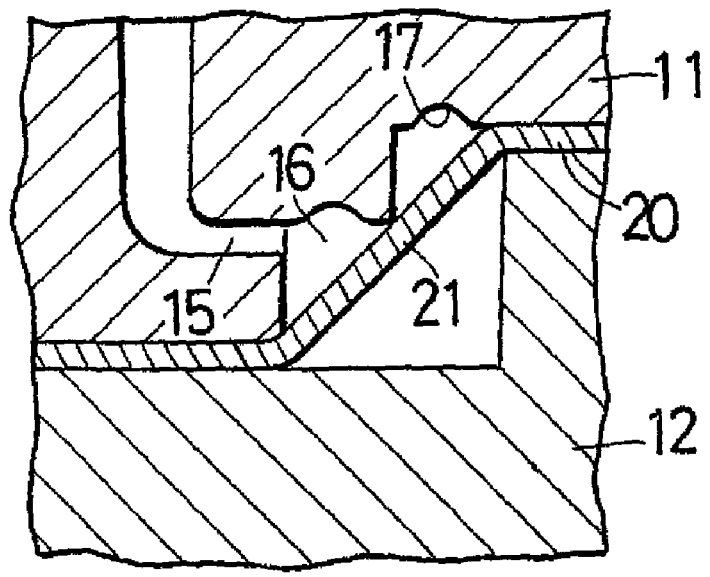
FIG. 7 is a fragmentary enlarged view of a cover outer peripheral frame in the injection-molding mold.

Thereafter, a movable mold member 12 is moved toward the stationary mold member 11 to press the sheet material 20, thereby plastically deforming it as shown in FIGS. 6 and 7. The plastically deformed sheet material 20 is in the shape of a box with a tapered portion 21 around the outer periphery thereof. The deformation of the tapered portion 21 of the sheet material 20 may cause wrinkle in the corner thereof. However, the wrinkled portion is softened and drawn to become unwrinkled by injection of a molten resin to form the cover outer peripheral frame 10, as described later. Therefore, there will be no problem.

Figure 8:
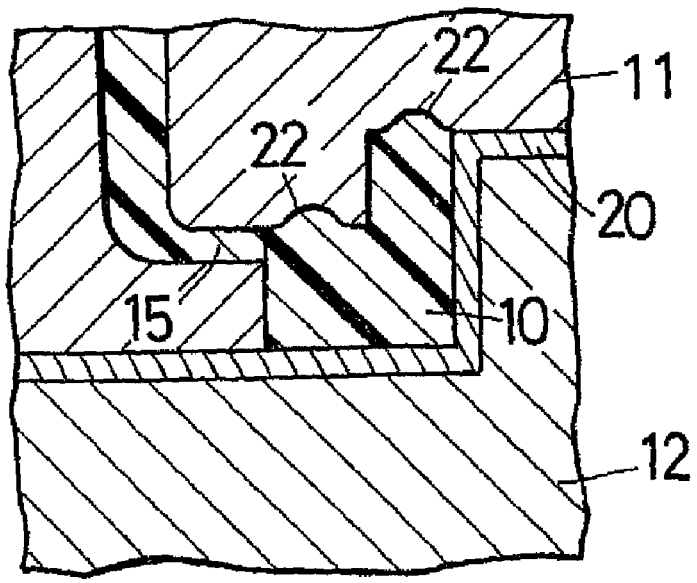
FIG. 8 is a sectional view showing a molten resin injected into a cavity for the cover outer peripheral frame.

As shown in FIGS. 6 and 7, a molten resin is injected into a sprue 13 from the nozzle tip of an injection molding machine to form the cover outer peripheral frame 10. The injected molten resin flows through a runner 14 and a gate 15 to fill a cavity 16 for forming the cover outer peripheral frame 10. The filling of the injected molten resin causes the tapered portion 21 to extend and come in close contact with the cavity surface of the movable mold member 12 as shown in FIG. 8. Thus, the cover outer peripheral frame 10 is constructed. The synthetic resin for forming the cover outer peripheral frame 10 is the same material as that of the sheet material 20. That is, one of the above-described resins, i.e. PBT, ABS, PC, PET, etc. is used. It is preferable to use a resin material that is excellent in chemical resistance and has a coefficient of thermal expansion close to that of the aluminum laminated film 7 constituting the battery element 2. The reason for this is to allow the cover outer peripheral frame 10 to follow a change in size of the battery element 2 even if the latter shrinks by heat.

As the result of filling the molten resin into the cavity 16, the molten resin and the sheet material 20 fusion-bond to each other to form the cover outer peripheral frame 10, as has been stated above. To effect the desired fusion bonding, it is preferable to use the same resin material for the cover outer peripheral frame 10 and the sheet material 20. It should be noted that injection molding as stated above is generally carried out for a plurality of products simultaneously from the viewpoint of improving productivity. Therefore, in actual practice, the molten synthetic resin is simultaneously injected into not only the cavity 16 but also a plurality of other cavities (not shown) through respective runners 14. Thus, a plurality of covers 4b are simultaneously produced by injection molding.

The casing body 4a has a thickness close to that of the battery element 2. The casing body outer peripheral frame 9 of the casing body 4a is provided with terminal windows 3. Further, an end portion of the casing body outer peripheral frame 9 of the casing body 4a is provided with a positioning hole A or a positioning projection (cylinder) B. If the projection B is provided on the casing body outer peripheral frame 9 of the casing body 4a, the hole A is provided in the cover outer peripheral frame 10 of the cover 4b. As has been stated above, the casing body outer peripheral frame 9 and the cover outer peripheral frame 10 are molded on the respective outer peripheral edges of the casing body 4a and the cover 4b. The joint portions of the casing body outer peripheral frame 9 and the cover outer peripheral frame 10 have the stepped portions 9a and 10a, respectively. The casing body 4a and the cover 4b are joined to each other through the stepped portions 9a and 10a.

Figure 9:
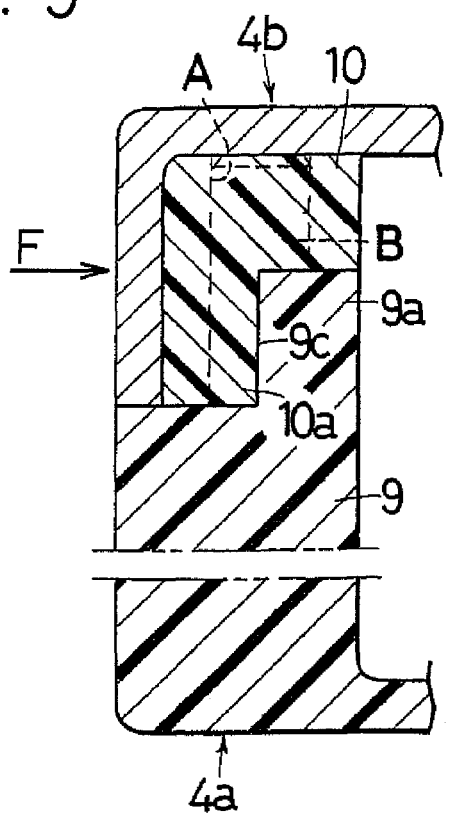
FIG. 9 is a fragmentary sectional view of an outer casing after bonding process.

The stepped portions 9a and 10a formed on the joint portions increase the mechanical strength of the outer casing 4. FIG. 9 is a fragmentary sectional view showing the casing body 4a and the cover 4b after they have been joined to each other. As shown in FIG. 9, when a load F is applied to the cover 4b, because the joint portions have the stepped portions 9a and 10a, respectively, the mating casing body 4a also receives the load F through the stepped portions 9a and 10a.

Accordingly, the load F is borne at the joint portions and also borne at mutually abutting portions 9c of the stepped portions 9a and 10a. Therefore, the joint strength is further increased in comparison to a joint structure having joint portions that are flat over the entire surfaces, for example. The structure according to the present invention is free from the likelihood of breakage of the outer casing 4, e.g. separation of the cover 4b from the casing body 4a, even if an impacting load is applied to the outer casing 4 when it is dropped, for example.

Welding portions (ridges) 22 for ultrasonic welding may be formed along the stepped portion 10a of the cover outer peripheral frame 10 of the cover 4b, according to need. The welding portions (ridges) 22 formed on the joint portion increase the strength of joining with the mating member and facilitate the joining. The welding portions 22 may be provided on the joint portion of the mating member. The joint portions can be joined together by fusion bonding even if they are flat. However, a joint portion with an uneven surface configuration is capable of enhancing the joint strength.

Further, positioning of the casing body 4a and the cover 4b during joining process can be effected by fitting the stepped portions 9a and 10a of the respective joint portions to each other. However, it is preferable to employ a positioning structure in which pins (not shown) formed on the casing body 4a are inserted into positioning holes formed in the protective circuit board 8 or the cover 4b to join the casing body 4a and the cover 4b to each other. With this structure, the casing body 4a and the cover 4b, including the protective circuit board 8, can be positioned with respect to each other.

Figure 10:
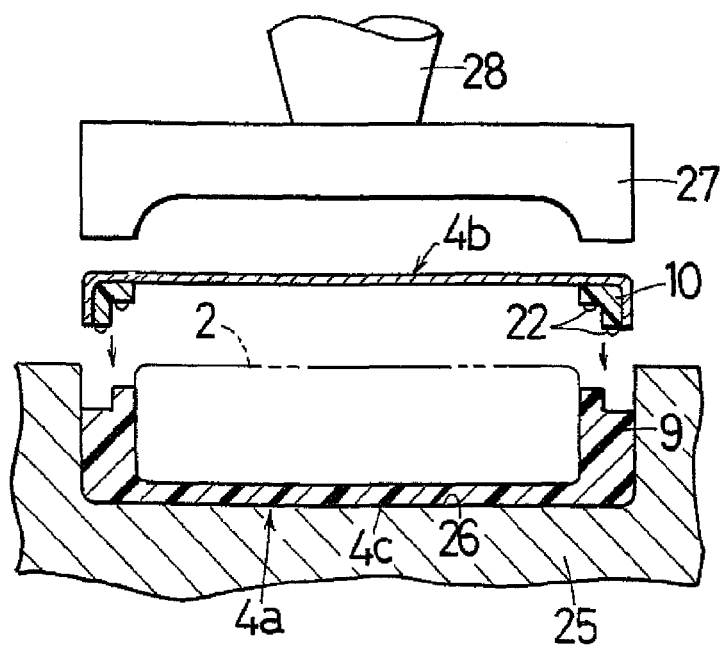
FIG. 10 is a sectional view showing the way in which the cover is joined to the casing body by ultrasonic welding.

FIG. 10 is a sectional view illustrating ultrasonic welding. The casing body 4a molded by the above-described method is inserted into a predetermined positioning recess 26 in a holder (fixing jig) 25, thereby being positioned. The battery element 2 is mounted in the casing body 4a. Further, the cover 4b is placed over the battery element 2 so as to face the casing body 4a across the battery element 2.

In this state, a tool horn 27 secured to the distal end of a stationary horn 28, which is driven by an ultrasonic oscillator (not shown) of an ultrasonic welding machine, moves downward to press a portion of the cover 4b corresponding to the cover outer peripheral frame 10. Ultrasonic welding is based on the principle that ultrasonic vibration is applied to the joint surfaces of two synthetic resins to weld them together by frictional heat.

More specifically, when the tool horn 27 being ultrasonically vibrated is brought into contact with one of two synthetic resin molded pieces to be welded together, ultrasonic vibration energy transmitted from the distal end of the tool horn 27 to the molded piece changes into mechanical vibration at the joint surfaces of the two molded pieces (this is known as "hammering effect"). Consequently, frictional heat is generated from the entire surfaces of the joint portions, causing the heated portions to be melted. Thus, the joint surfaces are welded together instantaneously.

The welding portions 22 of the casing body 4a are portions to be welded, which are known as "ridges". If ultrasonic energy is concentrated on the welding portions 22, the rise in temperature of the joint surface of the cover outer peripheral frame 10 is accelerated. Consequently, complete welding can be accomplished.

Thus, as shown in FIG. 10, the casing body 4a and the cover 4b are butted against each other in the direction of the arrows, and the stepped portions 9a and 10a of the joint portions of the casing body outer peripheral frame 9 and the cover outer peripheral frame 10 are joined to each other. The ultrasonic welding provides a beautifully finished joint and requires a short welding time. Ultrasonic welding can be effectively applied to the outer casing 4 of the present invention because it can be applied to small-sized products and carried out efficiently. With the ultrasonic welding, once the casing body 4a and the cover 4b have been butt-joined together, they cannot be disassembled. In actual practice, therefore, after the battery element 2, the protective circuit board 8 and so forth have been incorporated, the casing body 4a and the cover 4b are butt-joined to form an integral structure. FIG. 9 is a fragmentary sectional view of the butt-joint portion of the outer casing 4 after the bonding process.

The figures illustrating the first embodiment are schematically drawn for explanatory purposes. In actuality, the sheet material 20 and the cover outer peripheral frame 10 are extremely thin and very light in weight. External packaging by the outer casing 4 according to the present invention is mechanically strong because the outer casing 4 has the casing body outer peripheral frame 9 and the cover outer peripheral frame 10 and is provided with the stepped portions 9a and 10a. The outer casing 4 also exhibits superior effects in terms of design. Accordingly, the lithium-ion polymer secondary battery 1 can be offered as a product that is robust and exhibits a quality appearance.

Figure 11:
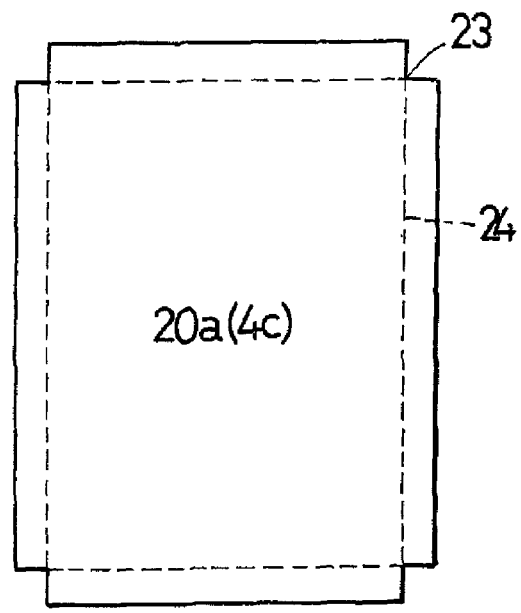
FIG. 11 illustrates an example showing another configuration of a sheet material for forming a side of the casing.

Further, because labeling, printing, etc. can be easily performed on the cover 4b even when it is in the stage of the sheet material 20, various designs can be given to the outer casing 4. Moreover, productivity can be increased. Although the sheet material 20 of the cover 4b has its outer peripheral edge folded during injection molding, as stated above, the sheet material 20 may be previously formed into a foldable configuration. FIG. 11 illustrates an example showing such a configuration of the sheet material. That is, the figure shows the original configuration of a sheet material 4c for forming a side of the outer casing 4. The sheet material 4c has cut portions 23 at four corners and further has fold lines 24 thereon.

Because the cut portions 23 and the fold lines 24 have been formed on the sheet material 20a before it is inserted into the injection-molding mold, the sheet material 20a is easy to deform at the time of molding. Accordingly, it is possible to mold the outer casing 4 accurately. Further, in this embodiment, the cover member has its outer peripheral portion folded as shown in the figures. However, the cover member may be a plane sheet without being subjected to forming process. Next, an embodiment in which the cover member is a plane sheet will be described.

Second Embodiment

Another Production Method for Outer Casing 4

Figure 12:
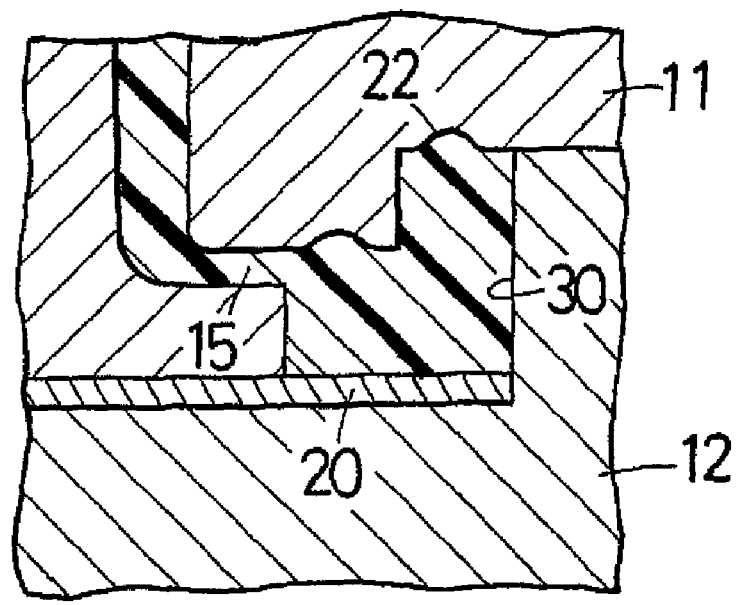
FIG. 12 is a sectional view of a molten resin injected into a cavity for an outer peripheral frame, which shows a second embodiment.
Figure 13:
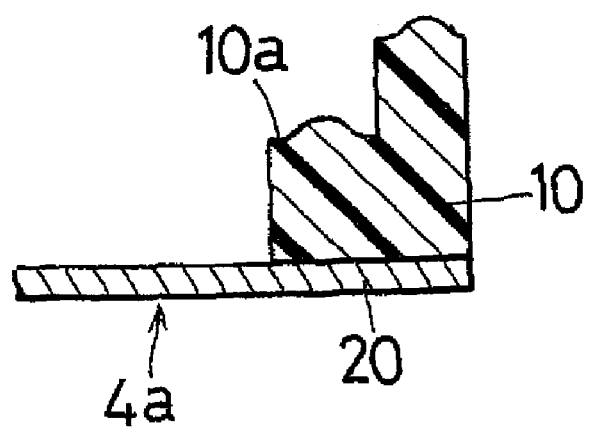
FIG. 13 is a fragmentary sectional view of a cover after molding process, which shows the second embodiment.

FIG. 12 is a diagram showing a second embodiment, which is a fragmentary sectional view of an injection-molding mold used to mold a cover 4b in the second embodiment. In the foregoing first embodiment, after the sheet material 20 has been plastically deformed, the cover outer peripheral frame 10 is injection-molded. In the second embodiment shown in FIG. 12, the sheet material 20 does not extend to the outer peripheral portion of the cover outer peripheral frame 10. Accordingly, there is practically no deformation of the sheet material 20 in a cavity 30. The second embodiment does not need trimming of the sheet material 20 after the injection molding process and hence facilitates manufacture. FIG. 13 is a fragmentary sectional view of the cover 4b after the molding process.

Third Embodiment

Thermoforming of Sheet Material

Figure 14:
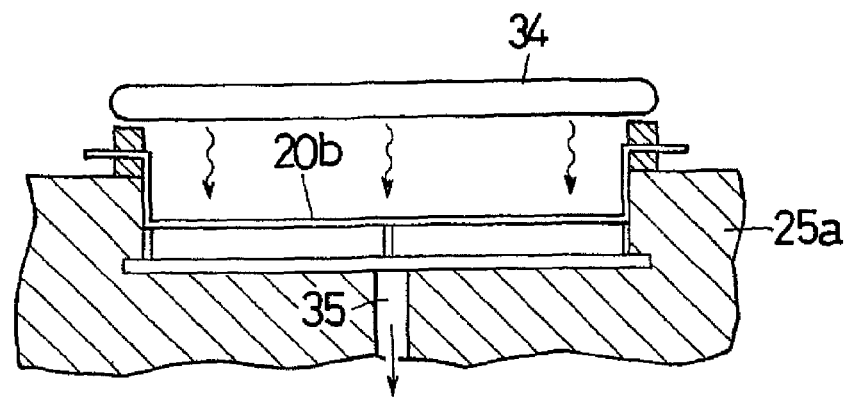
FIG. 14 is a sectional view of a thermoforming die for vacuum forming in a third embodiment.

In either of the foregoing first and second embodiments, the sheet material 4c of the cover 4b for forming a side of the outer casing 4 is formed into a predetermined shape in the injection-molding mold. In this embodiment, the sheet material is thermoformed before it is inserted into the injection-molding mold. FIG. 14 is a sectional view of a thermoforming die 25a for vacuum forming. As shown in FIG. 14, a sheet material 20b, which is a thermoplastic sheet, is fixed on the thermoforming die 25a and heated to soften with a heater 34. The softened sheet material 20b is sucked onto the thermoforming die 25a through a vacuum circuit 35 communicating with a vacuum device, thereby forming the sheet material 20b.

Figure 15:
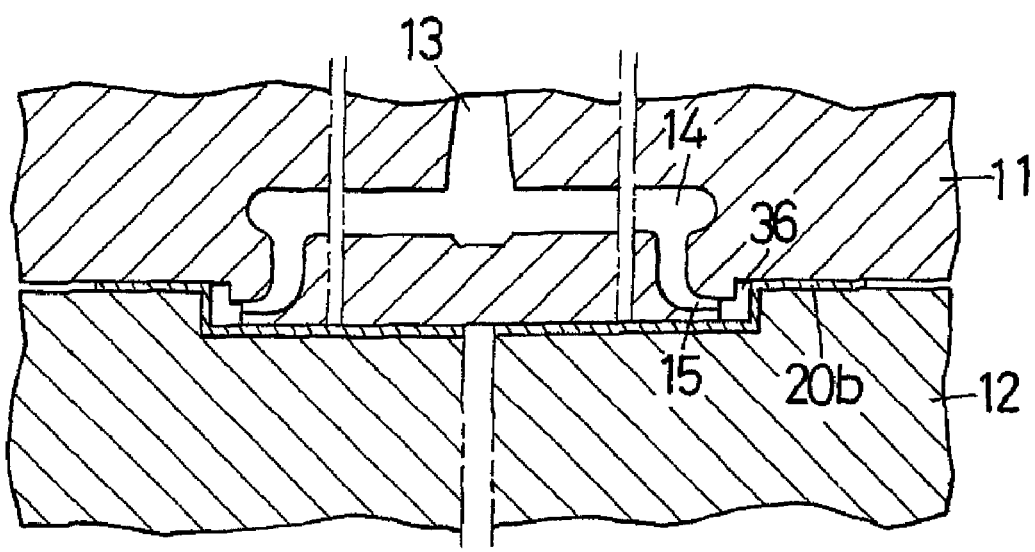
FIG. 15 is a sectional view showing an injection-molding mold when closed in the third embodiment.

Thereafter, the outer periphery of the thermoformed sheet material 20b is trimmed with a cutting device (not shown). As shown in FIG. 15, the thermoformed and trimmed sheet material 20b is inserted into an injection-molding mold. Then, a molten resin is injected to flow through a runner 14 and a gate 15 and filled in a cavity 36 for molding a cover outer peripheral frame 10 in the same way as in the foregoing embodiments.

Figure 16:
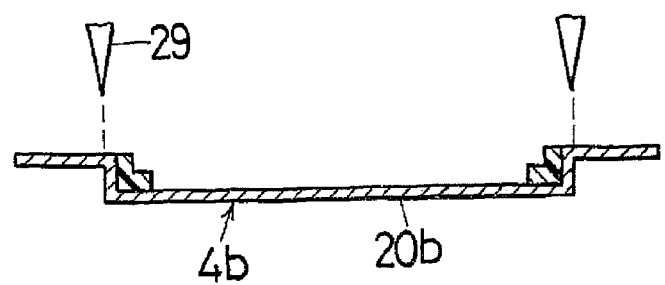
FIG. 16 is a sectional view of a cover after injection molding process in the third embodiment.

Thereafter, as shown in FIG. 16, an unnecessary portion at the outer periphery of the sheet material 20b is cut off with a cutting edge 29 to complete the cover 4b. It should be noted that the above-described thermoforming process is vacuum forming, and the forming pressure is not more than 1 atmospheric pressure. However, the thermoforming process may be pressure forming process wherein the sheet material is formed by using compressed air of the order of from 2 to 8 atmospheric pressures.

Fourth Embodiment

Thermoforming of Sheet Material

Figure 18:
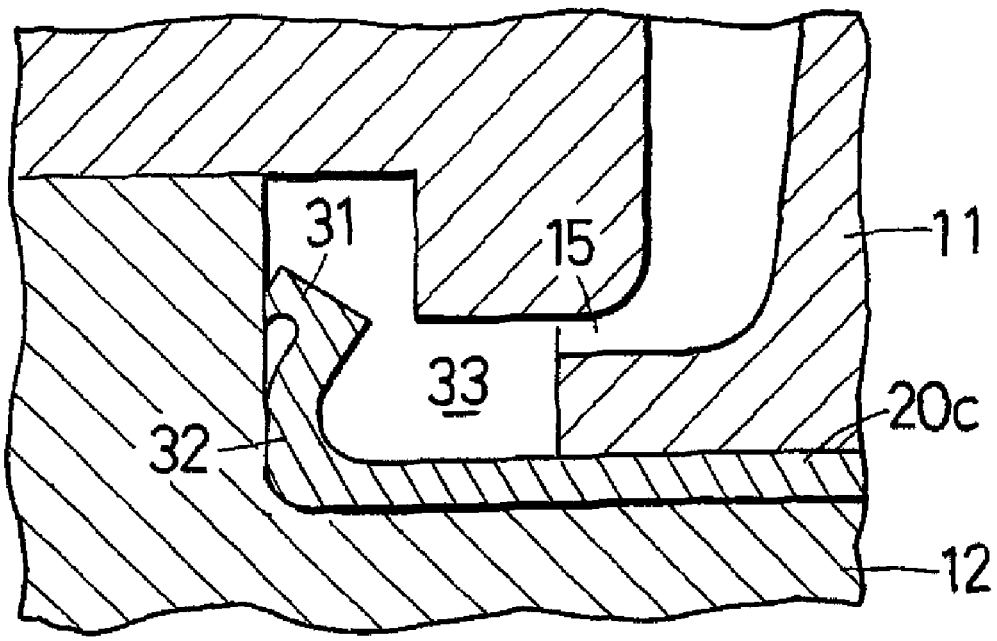
FIG. 18 is a fragmentary enlarged view of the injection-molding mold in the fourth embodiment.

A fourth embodiment is the same as the third embodiment in that the sheet material is thermoformed before it is inserted into an injection-molding mold. The fourth embodiment is also the same as the third embodiment in that the outer periphery of the thermoformed sheet material 20c is trimmed with a cutting device (not shown). As shown in FIG. 18, however, the thermoformed and trimmed sheet material 20c has burr 31 occurring on the cut surface as a result of the cutting process.

It is necessary to carry out a deburring step of removing the burr 31 before or after ultrasonic welding performed with an ultrasonic welding apparatus after the above-described injection molding. This embodiment enables the deburring step to be omitted. An outer peripheral portion 32 of the sheet material 20c constituting the cover outer peripheral frame 10 is cut shorter than the thickness h (see FIG. 19) of the cover outer peripheral frame 10.

Figure 17:
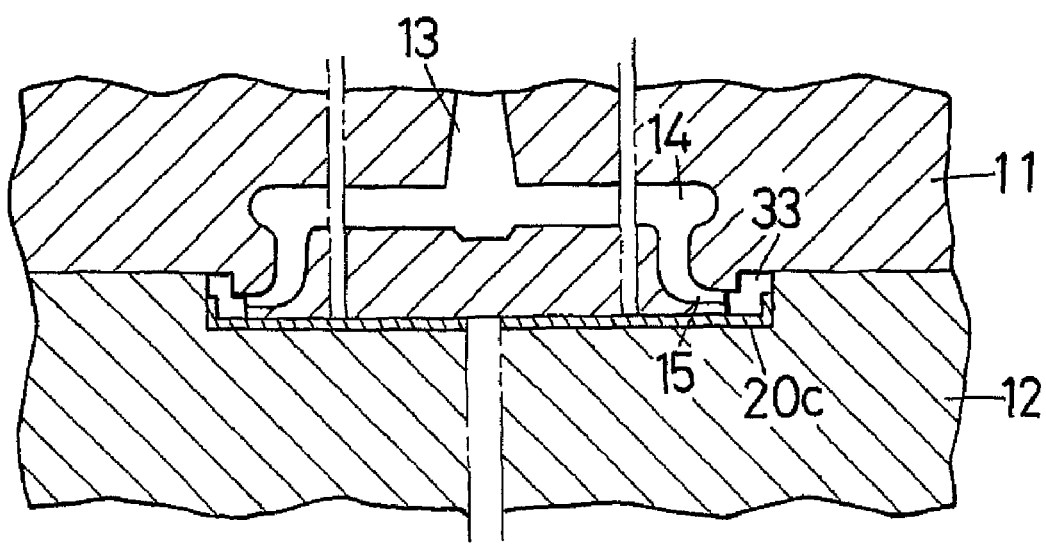
FIG. 17 is a sectional view showing an injection-molding mold when closed in a fourth embodiment.
Figure 19:
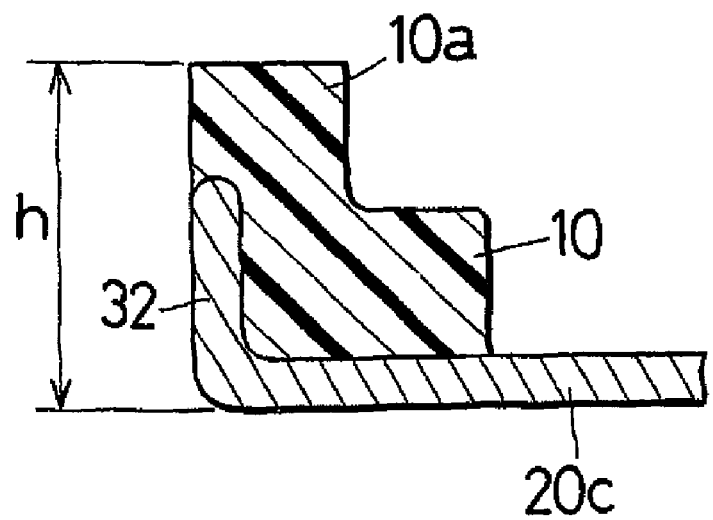
FIG. 19 is a fragmentary enlarged view of a cover after injection molding process in the fourth embodiment.

The outer peripheral portion 32 is positioned in a cavity 33 of an injection-molding mold shown in FIG. 17. When a molten resin is injected into the cavity 33, the outer peripheral portion 32 of the sheet material 20c softens and fusion-bonds to the molten resin into an integral structure (as shown in FIG. 19). Even if the sheet material 20c and the cover outer peripheral frame 10 are formed of different resin materials, the boundary between the sheet material 20c and the cover outer peripheral frame 10 is indiscernible with the naked eye, provided that the same coloring matter is used. Accordingly, the forming method according to the fourth embodiment eliminates the need for the trimming operation otherwise required after the injection molding process and hence allows the number of steps to be reduced, advantageously.

Fifth Embodiment

Another Configuration of Stepped Portion

Figure 20:
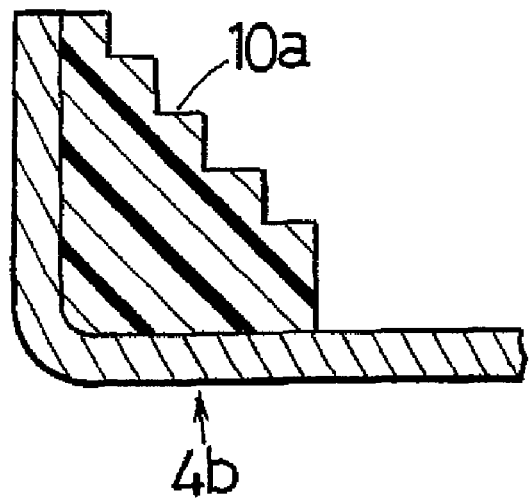
FIG. 20 is a fragmentary enlarged view of a cover after injection molding process in a fifth embodiment.

FIG. 20 shows an example in which the stepped portion 9a or 10a at the joint portion of the casing body 4 or the cover 4b of the outer casing 4 has a plurality of joint portions of different heights provided in a stair-shaped configuration. The figure shows an example in which the cover 4b has a stair-shaped stepped portion 10a. However, the casing body 4a may also have a stair-shaped stepped portion 9a. With this arrangement, the joint area is enlarged, and the joint strength is increased. An external force applied to the cover outer peripheral frame 10 can also be borne by the casing body outer peripheral frame 9 of the casing body 4a in the same way as the above. Therefore, the outer casing 4 can be reinforced effectively.

Sixth Embodiment

Still Another Configuration of Stepped Portion

Figure 21:
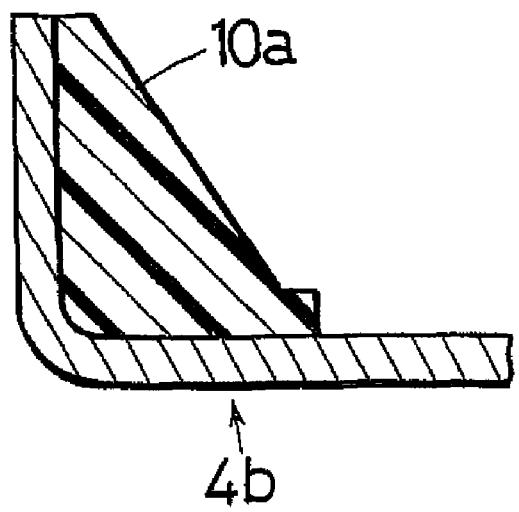
FIG. 21 is a fragmentary enlarged view of a cover after injection molding process in a sixth embodiment.

FIG. 21 shows an example in which the stepped portion 9a or 10a of the joint portion of the outer casing 4 has a slant surface. The figure shows an example in which the cover 4b has a stepped portion 10a with a slant surface. However, the casing body 4a may also have a stepped portion 9a with a slant surface. The slant surface is a special example of the configuration of the stepped portions 9a and 10a. However, an external force applied to the cover outer peripheral frame 10 can also be borne by the casing body outer peripheral frame 9 of the casing body 4a in the same way as the above-described example. Therefore, the outer casing 4 can be reinforced effectively.

Seventh Embodiment

Thermoforming for Obtaining Rounded Sheet Material

Figure 22:
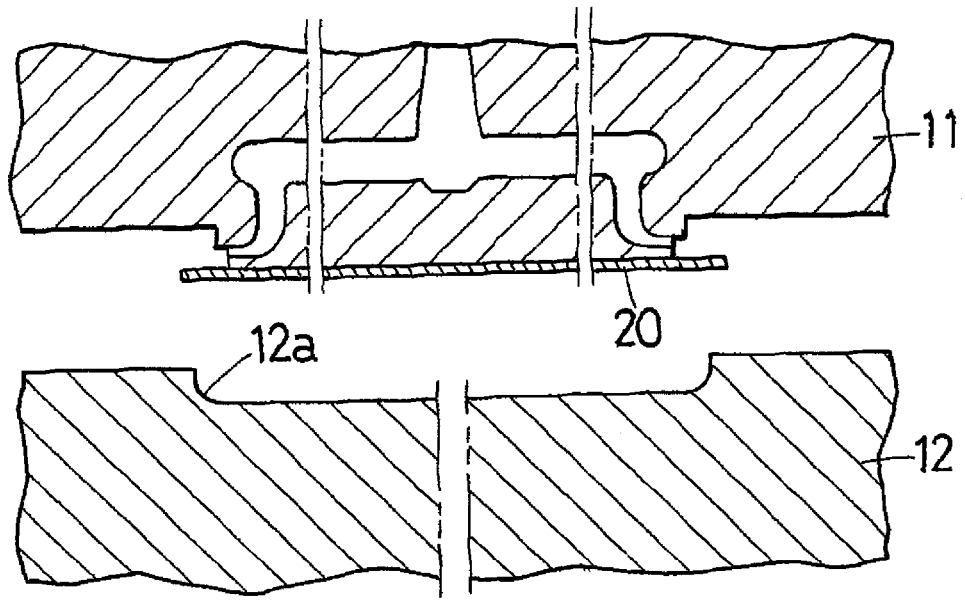
FIG. 22 is a sectional view of an injection-molding mold used to form a cover in a seventh embodiment.

In the thermoforming of the sheet material in the first embodiment shown in FIGS. 5 to 8, the sheet material 20 is plastically deformed with a rather large size in consideration of the fact that the whole deformed portion of the tapered portion 21 is fusion-bonded to the outer peripheral frame, as shown in FIGS. 5 to 8. In contrast to the first embodiment, the sheet material 20 in this seventh embodiment, as shown in FIG. 22, has a smaller size than that of the sheet material 20 shown in FIG. 5.

Figure 23:
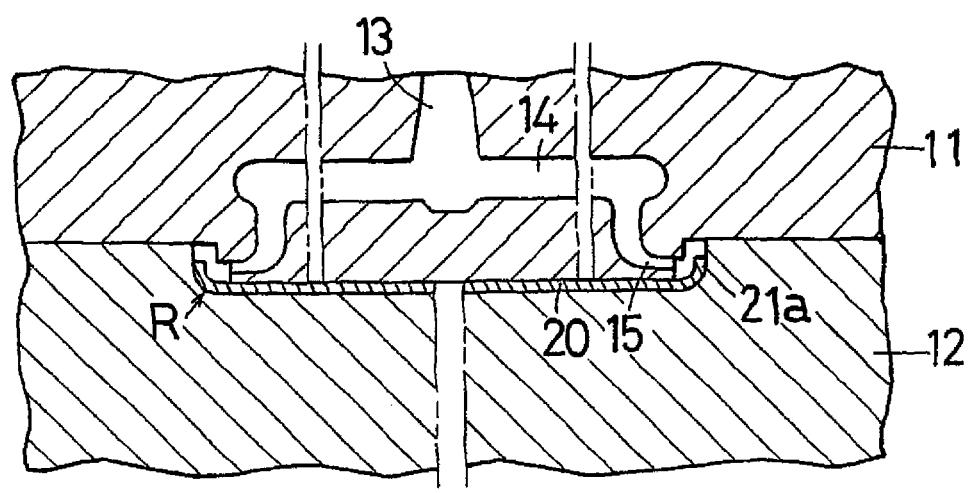
FIG. 23 is a sectional view showing the injection-molding mold when closed in the seventh embodiment.

Another feature of this embodiment resides in that a corner 12a of a movable mold member 12 is intentionally rounded. When the sheet material 20 vacuum-held to a stationary mold member 11 is pressed between the stationary and movable mold members 11 and 12 so as to be plastically deformed, the sheet material 20 becomes as shown in FIG. 23. After the plastic deformation, the outer peripheral portion 21a of the sheet material 20 is within the movable mold member 12 and will not extend outward of the frame. The outer peripheral portion 21a is rounded in conformity to the corner 12a of the movable mold member 12.

A molten resin injected from a gate 15 through a sprue 13 and a runner 14 is fusion-bonded to the outer peripheral portion 21a in such a manner that the injected resin covers the whole outer peripheral portion 21a along the round profile of the corner 12a of the movable mold member 12 and has a stepped configuration. The outer peripheral portion 21a constitutes a corner of the outer casing 4 when completed and hence provides a smoothly curved round configuration. With the round configuration, the mechanical strength of the outer casing 4 can be enhanced. In terms of design also, the round configuration gives effectively a smooth and soft appearance to the outer casing 4.

Eighth Embodiment

Another Lithium-Ion Polymer Secondary Battery

Figure 24:
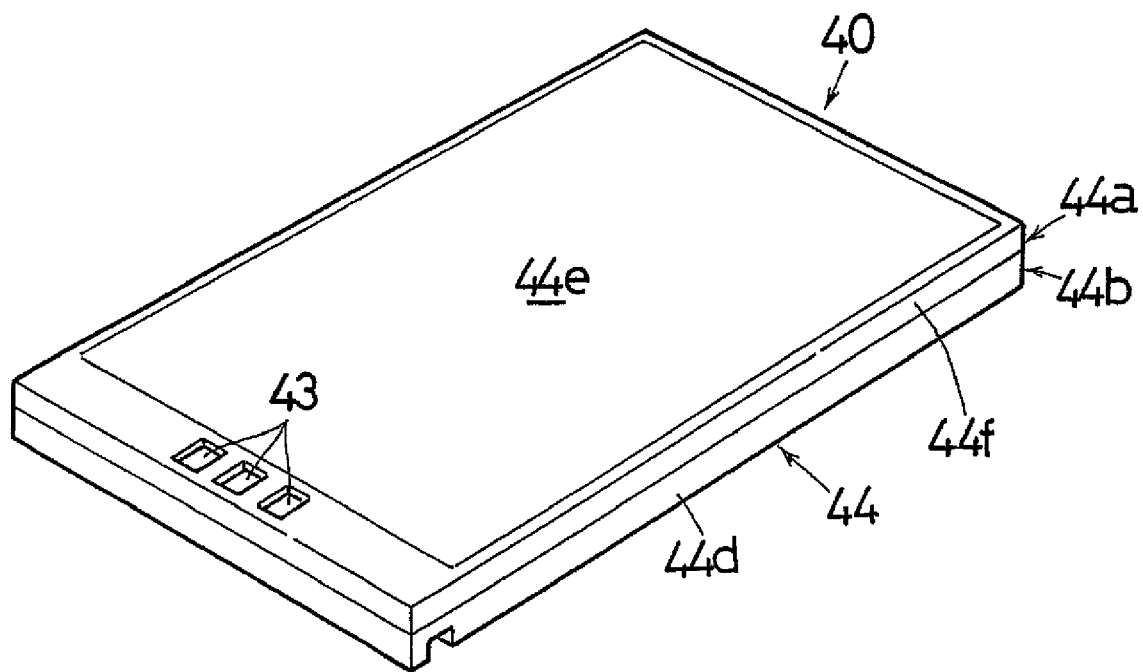
FIG. 24 is an external view showing a lithium-ion polymer secondary battery having another configuration.
Figure 25:
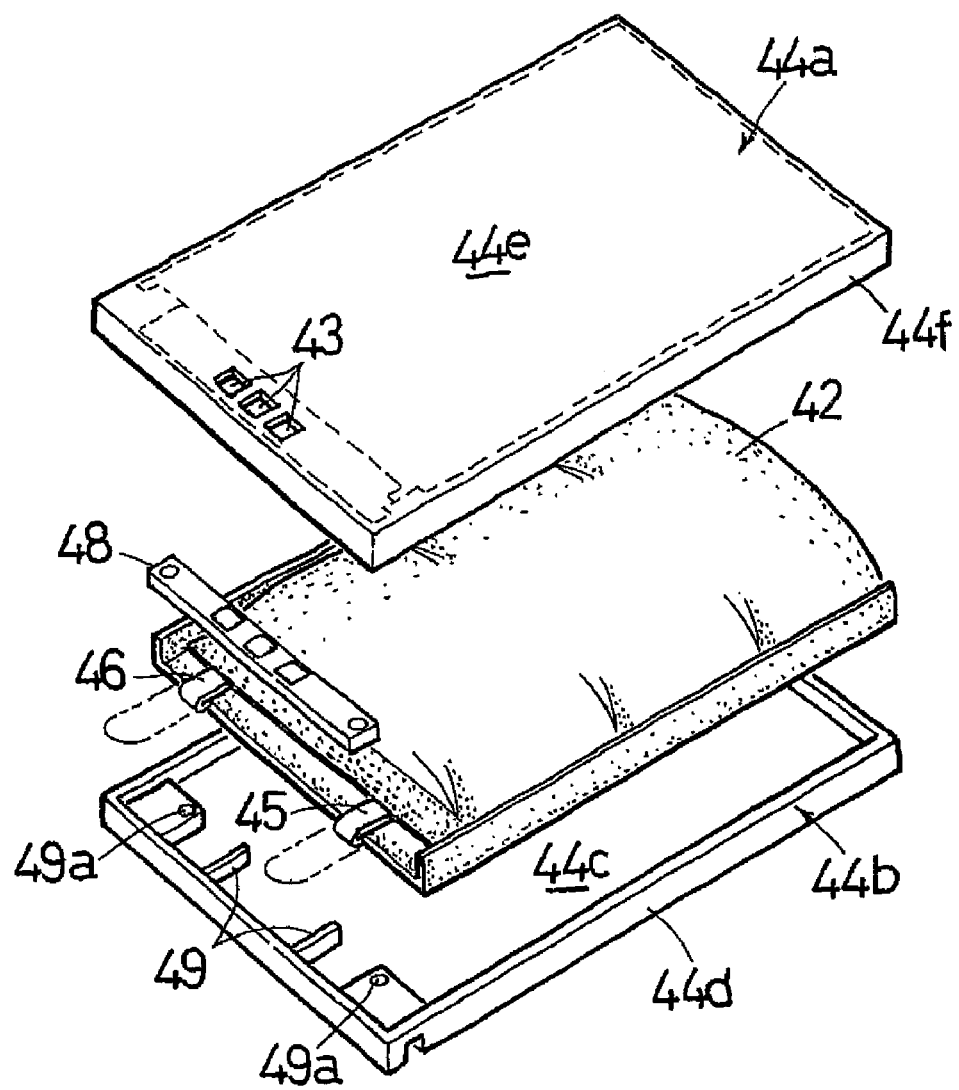
FIG. 25 is an exploded view illustrating the lithium-ion polymer secondary battery shown in FIG. 24.

FIG. 24 is an external view of a lithium-ion polymer secondary battery 40 to which the present invention is applied. FIG. 25 is an exploded view of the lithium-ion polymer secondary battery 40. The above-described casing body 4a shown in FIGS. 1 to 4 has the surface portion 9b for accommodating the battery element 2 and the casing body outer peripheral frame 9, which are simultaneously molded into an integral structure in the same cavity by injection molding.

The lithium-ion polymer secondary battery 40 shown in FIGS. 24 and 25 has an outer casing 44 comprising a first casing body member 44a and a second casing body member 44b prepared as a pair of casing body halves that are joined together into an integral structure. The first casing body member 44a and the second casing body member 44b are produced by substantially the same production method as that for the casing body 4a in the above-described first to eighth embodiments. Therefore, a repeated description of the structure and projection method concerning the first and second casing body members 44a and 44b is omitted.

The first casing body member 44a has a thin-walled, film-shaped first side panel 44e formed of a synthetic resin as stated above. A first outer peripheral frame 44f of a synthetic resin is molded on the outer peripheral edge of the first side panel 44e by the above-described injection molding method and integrally fixed to the first side panel 44e in the mold. Similarly, the second casing body member 44b has a film-shaped second side panel 44c formed of a synthetic resin. A second outer peripheral frame 44d of a synthetic resin is integrally formed on the outer peripheral edge of the second side panel 44c by injection molding.

The first outer peripheral frame 44f and the second outer peripheral frame 44d are opposed to each other and joined together into an integral structure by ultrasonic welding, adhesive or other similar means. The first casing body member 44a of the outer casing 40 has three terminal windows 43 in the form of through-holes, through which an electric current is input and output. The second casing body member 44b is formed with board supporting ribs 49, positioning holes 49a, etc. Positioning pins of the second casing body member 44b are inserted into the positioning holes 49a at the time of assembling. Therefore, the first casing body member 44a and the second casing body member 44b can be assembled with high accuracy.

A battery element 42, a protective circuit board 48, an anode terminal 45, a cathode terminal 46, etc. each have substantially the same structure and function as in the case of the foregoing lithium-ion polymer secondary battery 1. Therefore, a description thereof is omitted.

Other Embodiments

In the foregoing first to seventh embodiments, the sheet material 20 is provided to extend outside the outer peripheral frame as a skin. However, the sheet material 20 does not always need to be disposed outside the outer peripheral frame but may be disposed inside it.

INDUSTRIAL APPLICABILITY

The foregoing embodiments of the outer casing of the non-aqueous electrolyte battery according to the present invention are applied to a polymer battery packaged in an aluminum laminated film. However, the outer casing of the present invention is also applicable to external packaging for a metal case, e.g. a steel can, or an aluminum can, which houses a lithium-ion battery.

What is claimed is:

1. A production method for an outer casing for externally packaging a non-aqueous electrolyte battery including:
   a film-shaped first side panel (44e) formed of a synthetic resin that covers a side of said non-aqueous electrolyte battery that is wider than other sides of said battery;
   a film-shaped second side panel (44c) formed of a sheet material fabricated from a synthetic resin that covers a side (12e) of said non-aqueous electrolyte battery opposite to said side;
   a first outer peripheral frame (44f) formed of a synthetic resin that is integrally fixed to an outer peripheral edge of said first side panel (44e);
   a second outer peripheral frame (44d) formed of a peripheral side wall of the film-shaped second side panel (44c) and a synthetic resin that are integrally fixed to each other to form an outer peripheral edge of said second side panel (44c); and
   joint portions for integrally joining together said first outer peripheral frame (44f) and said second outer peripheral frame (44d) in opposed relation to each other, said production method comprising the steps of:
   inserting said first side panel (44e) into an injection-molding mold and injecting a synthetic resin onto an outer peripheral edge of said first side panel (44e) to integrally fix said first outer peripheral frame (44f) to the outer peripheral edge of said first side panel (44e), thereby forming a first casing body member (44a);
   inserting said second side panel (44c) into an injection-molding mold including a stationary mold member (11) and a movable mold member (12) operative to move towards and away from the stationary mold member (11), plastically deforming an outer peripheral edge of said second side panel (44c) by moving the movable mold member (12) towards the stationary mold member (11) with the second side panel (44c) disposed therebetween in order to press the second side panel (44c) against the stationary mold member (11) and thereby to form a tapered portion around an outer periphery thereof and injecting a synthetic resin at a selected force onto the tapered portion to plastically deform the tapered portion by forcing the tapered portion into a corner portion of the cavity of the movable mold member so that the deformed tapered portion and the injected synthetic resin form the outer peripheral edge of said second side panel (44c) to integrally fix said second outer peripheral frame (44d) to the outer peripheral edge of said second side panel (44c), thereby forming a second casing body member (44b); and
   opposing said first casing body member (44a) and said second casing body member (44b) to each other and integrally joining together said first outer peripheral frame (44f) and said second outer peripheral frame (44d);
   wherein said fixing said first side panel (44e) and said first outer peripheral frame (44f), and said second side panel (44c) and said second outer peripheral frame (44d) are fusion bonded by the molten resin for forming said first outer peripheral frame and by the molten resin for forming said second outer peripheral frame in the respective injection-molding molds, and said joining is effected by ultrasonic welding.

2. A production method according to claim 1, wherein welding portions (22) in the form of projections for said joining are formed on said first outer peripheral frame (44f) and/or said second outer peripheral frame (44d) to effect said ultrasonic welding.

* * * * *